E. F. KELLEY.
CLEVIS.
APPLICATION FILED JUNE 19, 1920.

1,393,379.

Patented Oct. 11, 1921.

INVENTOR
Edward F. Kelley
BY
Wooster & Braddock
ATTORNEYS

UNITED STATES PATENT OFFICE.

EDWARD F. KELLEY, OF BRIDGEPORT, CONNECTICUT, ASSIGNOR TO THE RAYBESTOS COMPANY, OF BRIDGEPORT, CONNECTICUT, A CORPORATION OF CONNECTICUT.

CLEVIS.

1,393,379.      Specification of Letters Patent.      Patented Oct. 11, 1921.

Application filed June 19, 1920. Serial No. 390,120.

*To all whom it may concern:*

Be it known that I, EDWARD F. KELLEY, a citizen of the United States, residing at Bridgeport, county of Fairfield, State of Connecticut, have invented an Improvement in Clevises, of which the following is a specification.

Heretofore, so far as I am aware, the several varieties of external brakes suitable for trucks of the converted Ford type have all been operated by means of wire cables located between the operating levers of the brakes and the brake levers of the truck.

This invention has for one of its objects to provide means whereby brake rods may be substituted for the wire cables heretofore used to operate brakes of the present character, and to this end I produce a novel clevis which is adapted to be located between a brake lever and a brake rod, to properly position the brake lever with respect to the operating lever of the external brake, and is furthermore adapted to allow for necessary play between the brake lever and brake rod.

A further object of the invention is to provide means whereby the brake rod of the Ford car from which the truck is converted may be used in the converted truck, and this without altering or changing the brake rod in any manner.

With the above and other objects in view, the invention comprises the construction and arrangement of parts as now to be fully described and hereinafter specifically claimed.

Figure 1:
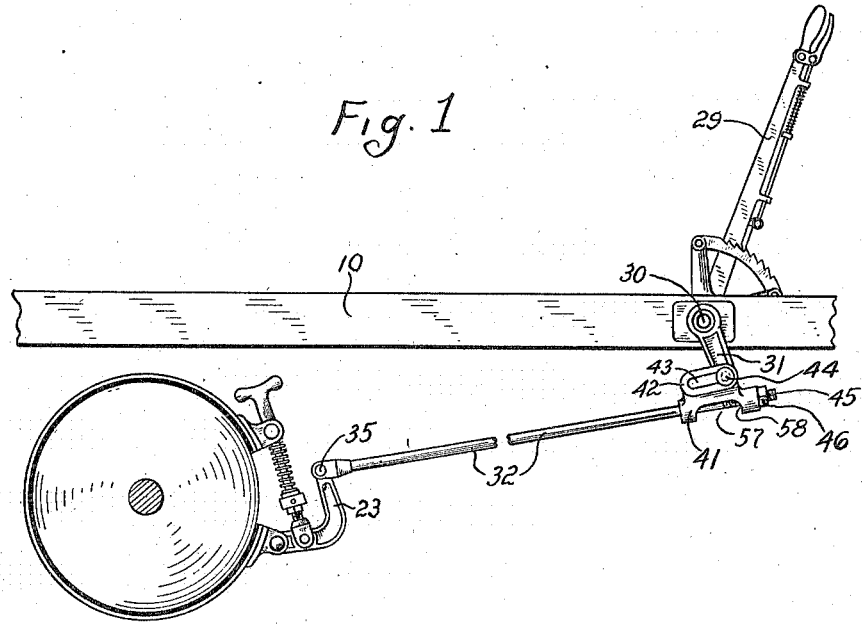
Figure 2:
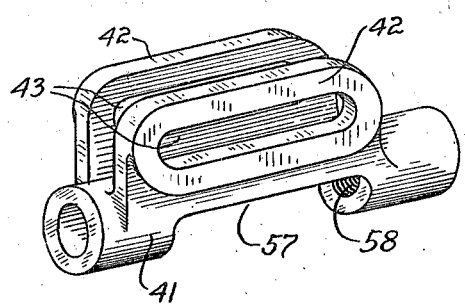

In the accompanying drawing forming a part of this specification,

Figure 1 is a view of a part of an automobile truck showing the application of the novel clevis to the braking mechanism; and Fig. 2 is a perspective view of the clevis of the invention.

10 denotes the frame of an automobile truck, 31 a brake lever which is rigidly secured to a brake lever shaft 30 carried by the frame, 29 the hand lever by which the brake lever shaft is rotated to actuate the brake lever, and 23 denotes an operating lever of an external brake.

The clevis of the invention is adapted to be located between the brake lever and a brake rod 32 which is pivoted to the operating lever as indicated at 35, and consists of a tube 41 which is cut away as indicated at 57 and a portion of which is threaded as indicated at 58. Parallel ears extending from the tube are provided with elongated slots 43.

As very clearly shown in Fig. 1, the brake rod is arranged in the tube of the clevis, and its threaded portion 45 is adapted to engage the threaded portion of the tube, which, as disclosed, is the portion of the tube spaced at farthest distance from the operating lever of the brake. Nut 46 locks the brake rod in position. The lower end of the brake lever is adapted to be positioned between the ears of the clevis and a pin 44 passing through the elongated slots in the ears and through the brake lever affords the pivotal connection and allows for necessary play between the brake lever and the brake rod.

By the construction and arrangement of the clevis as shown and described, I am enabled to use in a converted truck the brake rod of the Ford car from which the truck is converted. That is by provding the partially threaded tube and arranging it so that its threaded portion is located a suitable and fixed distance to the right of the brake lever as disclosed in Fig. 1, I provide means whereby a brake rod which is slightly longer than the distance between the operating lever and the brake lever may be utilized. As before mentioned, the elongated slots provide for the necessary play between the brake lever and the brake rod. In the case of trucks of the present character, when the truck jolts and its body and rear axle are caused to move toward each other, there is a consequent movement of the operating lever of the brake toward the front of the truck, or toward the right as shown in Fig. 1. The arrangement, as disclosed, is such that the pin which pivots the brake lever to the clevis is normally located in the front ends of the elongated slots. When now the truck body is jolted and the rear axle causes the brake rod to be moved forwardly, its forward movement is accommodated by reason of the fact that the ears of the clevis are caused to move toward the right in Fig. 1 and the pin which pivots the brake lever to the clevis rides in the elongated slots, as will be evident.

The cable wire heretofore used in connection with brakes of the present type has required frequent adjustments on account of the fact that it has become stretched and disproportioned by reason of the strain exerted upon it in use. The brake rod which is capable of use with the clevis of the invention will indefinitely hold its shape and need practically no adjusting whatever. When adjustments are required, they can be easily made by simply changing the position of the brake rod in the clevis.

What I claim is:

1. A clevis of the character described, comprising a tube from which extend a pair of slotted ears, both said ears being located on the same side of the axis of the tube.

2. A clevis of the character described, comprising a partially threaded tube having extending therefrom a pair of parallel ears provided with elongated slots, both said ears being located on the same side of the axis of the tube.

3. A clevis of the character described and for the purpose specified, comprising a partially threaded tube which is adapted to be engaged by the brake rod of a brake and from which extend a pair of parallel, slotted ears, both said ears being located on the same side of the axis of the tube and adapted to be engaged by a pin located in the brake lever of an automobile truck, whereby said brake lever and brake may be properly positioned with respect to each other and necessary play may be allowed between said brake lever and brake rod.

4. A clevis of the character described, comprising a partially threaded and partially cut away tube from which extend a pair of ears provided with elongated slots, as and for the purpose specified.

5. A clevis of the character described, comprising a tube which is adapted to be engaged by the brake rod of a brake and from which a pair of parallel ears extend, said ears being located on the same side of the axis of the tube and adapted to be located on opposite sides of a brake lever and provided with elongated slots adapted to be engaged by a pin located in said brake lever, whereby necessary play may be allowed between said brake lever and brake rod.

6. A clevis of the character described, comprising a tube provided with an ear on one side and intermediate the ends thereof, said ear being provided with an elongated slot extending longitudinally of the tube.

7. A clevis of the character described, comprising a tube provided with an ear at one side of the axis of the tube, said ear being provided with an elongated slot extending longitudinally of the tube and so located that a pin extending through the slot will be at one side of a rod inserted in the tube.

8. A clevis of the character described, comprising a tube provided with a pair of substantially parallel spaced ears provided with elongated slots extending longitudinally of the tube, both said ears being located on the same side of the axis of the tube.

9. A clevis of the character described, comprising a tube having an elongated slot extending longitudinally of the tube and adapted for insertion of a pin transversely of the tube but at one side of the passage through the tube.

In testimony whereof I affix my signature.

EDWARD F. KELLEY.